(12) United States Patent
Koenigstein et al.

(10) Patent No.: US 8,128,107 B2
(45) Date of Patent: Mar. 6, 2012

(54) PASSIVELY STEERABLE MODULE AXLE

(75) Inventors: Klaus Koenigstein, Martinshoehe (DE);
Muller Laurent, Butten (FR); Christian Fuhrmeister, Homburg (DE)

(73) Assignee: Terex-Demag GmbH & Co. KG (DE)

( * ) Notice: Subject to any disclaimer, the term of this patent is extended or adjusted under 35 U.S.C. 154(b) by 0 days.

(21) Appl. No.: 12/843,126

(22) Filed: Jul. 26, 2010

(65) Prior Publication Data
US 2011/0175312 A1    Jul. 21, 2011

Related U.S. Application Data

(63) Continuation of application No. 11/658,167, filed on Apr. 23, 2007, now Pat. No. 7,770,906.

(51) Int. Cl.
*B62D 61/12* (2006.01)
(52) U.S. Cl. ...................................... 280/86.5; 180/209
(58) Field of Classification Search ............... 180/24.02, 180/209; 280/81.1, 81.5, 81.6, 86.5, 86.751, 280/124.11, 124.157, 88, 89.11, 89.13, 90, 280/93.502, 757–760
See application file for complete search history.

(56) References Cited

U.S. PATENT DOCUMENTS

| | | | |
|---|---|---|---|
| 2,097,739 A | 11/1937 | Rossman | |
| 2,974,976 A * | 3/1961 | Lyall | 280/86.5 |
| 3,481,620 A | 12/1969 | McCoy | |
| 3,704,896 A | 12/1972 | Buelow | |
| 4,856,814 A | 8/1989 | Jones | |
| 5,018,756 A | 5/1991 | Mitchell | |
| 5,088,570 A | 2/1992 | Loeber | |
| 5,163,700 A | 11/1992 | Loeber | |
| 5,269,553 A * | 12/1993 | Alonso | 280/402 |
| 5,308,105 A | 5/1994 | Fujan et al. | |
| 5,333,895 A | 8/1994 | Fujan et al. | |
| 5,364,113 A | 11/1994 | Goertzen | |
| 5,403,031 A | 4/1995 | Gottschalk et al. | |

(Continued)

FOREIGN PATENT DOCUMENTS

DE    2837398    8/1978

(Continued)

OTHER PUBLICATIONS

International Search Report mailed Jan. 22, 2007 for Application PCT/EP2005/007802.

(Continued)

*Primary Examiner* — Faye M Fleming
*Assistant Examiner* — Laura Freedman
(74) *Attorney, Agent, or Firm* — Cantor Colburn LLP (57) ABSTRACT

In conventional vehicle cranes it is usually necessary in consideration of current safety regulations to provide at least two separate steering circuits for all steered axles so that, in the event of a failure of one circuit, the vehicle crane can continue to be steered by way of the other. In order to avoid that in accordance with the invention at least one steered rear axle of a vehicle crane (1) is provided with a caster (a) so that at least one axle (11-16), in the event of a steering failure, remains steerable passively by utilizing the caster friction. That principle is applied in a similar manner to a module axle (2) which can be mounted to the vehicle crane (1) and which can be required for transporting additional equipment or an additional counterweight which is possibly required.

20 Claims, 8 Drawing Sheets

U.S. PATENT DOCUMENTS

| | | | |
|---|---|---|---|
| 5,620,194 A | 4/1997 | Keeler et al. | |
| 6,073,946 A | 6/2000 | Richardson | |
| 6,186,266 B1 * | 2/2001 | Marchant et al. | 180/409 |
| 6,293,570 B1 | 9/2001 | Gottschalk et al. | |
| 6,669,303 B2 | 12/2003 | Dodd | |
| 6,991,061 B2 | 1/2006 | Laurent | |
| 7,281,721 B2 | 10/2007 | Hudson et al. | |
| 7,878,291 B2 * | 2/2011 | Pohl | 180/408 |
| 2009/0133954 A1 | 5/2009 | Pohl | |

FOREIGN PATENT DOCUMENTS

| | | |
|---|---|---|
| DE | 19728822 | 3/1999 |
| DE | 10112084 | 9/2002 |
| EP | 0895923 | 2/1999 |

OTHER PUBLICATIONS

Written Opinion of the International Searching Authority mailed Jan. 22, 2007 for Application PCT/EP2005/007802 filed Jul. 18, 2005.

* cited by examiner

PASSIVELY STEERABLE MODULE AXLE

CROSS REFERENCE TO RELATED APPLICATIONS

The present application is a continuation of U.S. patent application Ser. No. 11/658,167 filed on Apr. 23, 2007, now U.S. Pat. No. 7,770,906 entitled "Passively Steerable Module Axle" which is incorporated herein in its entirety.

FIELD OF THE INVENTION

The present invention relates generally to the chassis arrangement of a mobile crane and in particular to a multi-axle vehicle crane with at least one actively steered axle which can also be passively steered. The invention further concerns a vehicle crane with a chassis, to the rear of which an actively steerable module axle which is also passively steerable can be releasably mounted. That module axle is in particular an additional axle which can be fitted to the chassis of a vehicle crane and which during fault-free travel operation of the vehicle crane is coupled to the steering circuit for the axles of the chassis and which is still passively steered in the event of failure of the active steering by means of the steering circuit of the chassis as a consequence of a preset caster property.

BACKGROUND

As vehicle or mobile cranes of the kind set forth in the opening part of this specification can also travel on public roads, they must comply with the respective road traffic regulations. That involves in particular complying with the permissible axle loads for on-road travel. Thus for example the permissible axle load in Germany is 12 tonnes. Admittedly some countries, for example the Netherlands, allow higher permissible axle loads—thus for example an axle load of 13 tonnes is allowed in the Netherlands—the permissible laden weight of a vehicle crane is nonetheless however generally limited by the respectively permissible axle loads.

In order not to exceed the permissible axle loads in spite of an increase in the total laden weight of a vehicle crane, for example by virtue of transporting ancillary equipment and by virtue of the counterweights required for a given use, it is already known for a so-called additional axle to be releasably mounted to the rear of the chassis or running gear of the vehicle crane. The fitment of such an additional axle can ensure that the total laden weight of the vehicle crane which is increased as a consequence of ancillary equipment and an additional counterweight is distributed to a further axle, whereby the loading per axle overall can be further reduced. By virtue of mounting such an additional axle it is then possible for example to travel to a location of use just with the vehicle crane alone and without further transport vehicles which are normally required for transporting ancillary equipment and possibly an additional counterweight, as the chassis which is modified in that way can carry more weight, as a consequence of the additional axle.

An additional axle of the kind which is already known should—but does not necessarily have to—be integrated completely into the braking, suspension and steering system of the chassis of the vehicle crane. Then no downgrading in terms of steering angle, braking or suspension system has to be accepted by virtue of integration of the additional axle into the maneuvering system of the vehicle crane itself. If however the additional axle is not coupled to the braking, suspension and steering system of the chassis of the vehicle crane, the effect of that can be that the braking and/or suspension travels of the vehicle crane are worsened and the turning circle also increases, as a consequence of the total laden weight of the vehicle crane which is increased by any ancillary equipment and additional counterweight.

In DE 101 12 084 A1 a mobile thick matter pump is disclosed comprising a hydraulically operated support construction, a distribution boom and a pneumatic cushioned trailing axle. To ensure stability during the pump operation, the trailing axle can be lifted by means of a lifting element by bleeding the pneumatic suspension, whereby the bleeding of the pneumatic suspension and the operation of the lifting element and a locking element can be controlled according to the on-condition of the auxiliary drive of the vehicle motor, used to supply the compressed oil of the drive hydraulics. It is mentioned that a trailing axle may be constructed to be steerable.

In DE 28 37 398 A1 a multi-axle vehicle crane is disclosed having at least one active steered axle. The multi-axle vehicle comprises a trailing or module axle, respectively which can be fitted to the chassis of the vehicle crane. This known module axle and trailing module, respectively comprises at least one steerable axle. The steering gear of this steering axle is coupled to the steering gear of the chassis of the vehicle crane.

A trailerable load-transferring assembly as shown in US 2004/0007840 A1 is releasably attachable to the rear portion of a load-bearing vehicle. The load-transferring assembly includes a pivot connection, an auxiliary axle, an elongate abutment member that extends between a free end and an abutment end, and an actuator assembly disposed between the free end of the abutment member and the auxiliary axle. When the load-transferring assembly is connected to the vehicle by the pivot connection, the actuator assembly is actuated such that it applies a lifting force on the free end relative to the auxiliary axle. The auxiliary axle is configured as a self steering axle. It is mentioned, that in some embodiments, it may be desirable to lock the wheels of the auxiliary axle in a position suitable for straight movement in reverse.

An additional axle as mentioned above which is not integrated into the braking, suspension and steering system of the chassis is known for example from DE 197 28 822 A1 which is referred to therein as an attachment trailing chassis arrangement. The attachment trailing chassis arrangement described therein is specifically calibrated in respect of its weight distribution, so that, utilising the coupling and locking means provided thereon, it can be attached to the chassis of a vehicle crane using the lever assembly thereof, and if necessary can be released therefrom again. However, as has already been mentioned above, that attachment trailing chassis arrangement is found to be disadvantageous by virtue of the fact that it is not integrated into the suspension system of the chassis of the vehicle crane. As therefore the trailing chassis arrangement is not integrated either into the braking system or into the suspension system of the vehicle crane, that additional axle cannot be utilised for dynamic axle load compensation. A further disadvantage of the attachment trailing chassis arrangement described in DE 197 27 822 A1 is also that the axle thereof cannot be steered actively by way of the steering circuit of the chassis of the vehicle crane. Rather, that attachment trailing chassis arrangement only has a slight trailing action with limited lock angles, whereby the axle is itself passively steered only to a slight degree by steering movements initiated by way of the steering arrangement of the chassis of the vehicle crane. Active steering which could overall positively influence the turning capability of the vehicle crane is however not provided in the case of that attachment trailing chassis arrangement.

A further disadvantage of steered axles of multi-axle vehicle cranes is that the current safety regulations require that each steered axle, in the event of a failure, still remains controllable for example by way of an emergency steering circuit. Thus the chassis arrangement of a vehicle crane usually includes a main steering circuit which in turn has a first and a second steering circuit. In that case, the one steering cylinder of the respective steered axle is controlled by way of the first steering circuit and the other steering cylinder of the respective steered axle is controlled by way of the second steering circuit. In the event that now either the first and/or the second steering circuit should fail, the axle should still continue to be controllable by way of the emergency steering circuit, insofar as for example an emergency steering pump pumps hydraulic oil into the respectively defective steering circuit. However the installation of an emergency steering circuit in a vehicle crane, the implementation of which has already been effected by Terex-Demag GmbH & Co KG/Germany under the name 'Fail Operational System' is very cost-intensive and complicated and in addition can result in an unwanted increase in the total laden weight of the vehicle crane which, as is known, is to be kept low.

If therefore the attempt were made to also steer a separate additional axle which can be mounted releasably to the chassis in an active mode by way of the steering system of the chassis of the vehicle crane, it would then be necessary, for safety reasons, for that additional axle to be steered not only by way of the main steering circuit of the chassis but, to cover the event of a failure of the main steering circuit, to provide at least one emergency steering circuit with which the additional axle would remain steerable even in a fault situation. Admittedly, the provision of an emergency steering circuit for all steered axles of a chassis of a vehicle crane, as explained, is already known, but, so that an additional axle could also be reliably steered actively together with the running gear of the chassis, the additional axle would have to be suitably converted so that in the normal situation it also remains reliably controllable by way of the main steering circuit and in the event of failure thereof it remains controllable by way of the emergency steering circuit which then comes into action. Admittedly such a control configuration for the additional axle by way of an emergency steering circuit has already been developed by Terex-Demag GmbH & Co KG/Germany under the term 'Fail Operational System' and has also been implemented, but that system not only affords the desired advantages but also involves the above-described disadvantages such as for example an increase in total laden weight. In addition the interface for electro-hydraulic coupling of the additional axle to the chassis of the vehicle crane, which is required for active steering of the additional axle, is a constant weak point, the disadvantages of which have to be eliminated as far as possible.

SUMMARY

Taking as the basic starting point the above-described problems and disadvantages in regard to controlling the steering of actively steered axles of a vehicle crane and in particular a module axle which can be releasably mounted to a chassis of a vehicle crane, the object of the invention is to provide a vehicle crane having at least two actively steering axles which are actively steered in fault-free operation by way of a main steering circuit and which in the event of failure of the main steering circuit remain controllable so that the expensive and complicated installation of an emergency steering circuit in the vehicle crane is not required.

To achieve the above-indicated object, there is provided a vehicle crane having a chassis whose steered axles are controlled by way of a main steering circuit; so that the permissible total laden weight is not exceeded in the event of loading ancillary equipment and/or an additional counterweight on the vehicle crane, it is possible to releasably mount to the rear of the chassis an additional module axle which in fault-free operation of the steering circuit of the chassis is actively steered by way thereof. So that the additional module axle remains controllable in the event of failure of the active steering by means of the main steering circuit of the chassis, the axle swivel pin of the additional module axle is arranged at a caster or caster angle a so that, after the module axle has been separated from the steering circuit of the chassis in the event of failure of the active steering assembly, the module axle still continues to steer passively utilising the preset caster properties. Admittedly, by virtue of that caster friction caused by the preset caster angle of the module axle, it is not possible to actively influence the maneuverability of the vehicle crane but the vehicle crane or the module axle remains passively maneuverable and does not remain rigidly at the steering angle which was last selected, as could otherwise be the case in the event of a software failure of the main steering circuit.

An advantage which can be achieved with the present invention is thus that the module axle which can be releasably mounted to the chassis of the vehicle crane does not have to be coupled to an emergency steering circuit of the chassis of the vehicle crane in order to ensure maneuverability of the module axle in the event of failure of the main steering circuit of the vehicle crane. By the module axle being constructed with a preset caster angle, there is thus no need for the module axle to be controlled by way of an emergency steering circuit, for example by way of the so-called 'Fail Operational System', in the event of a failure of the main steering circuit. It is thus possible with the module axle according to the invention to circumvent the complicated and expensive provision of active steering by way of an emergency steering circuit for the module axle, and to avoid unnecessary and unwanted additional weight which would be entailed in the implementation of an emergency steering circuit for the module axle. Thus the overall weight of the module axle can be minimising, as a consequence of an emergency steering circuit which would otherwise usually be required, and at the same time the permissible total laden weight of the vehicle crane can be maximized as a consequence of the releasable mounting of the module axle to the chassis of the vehicle crane.

So that the module axle can be actively steered in fault-free operation of the main steering circuit the module axle is equipped with at least one steering cylinder which is electro-hydraulically operated by way of the main steering circuit of the chassis. As in the event of a failure of the active steering the rear of the chassis of the vehicle crane or the module axle can tend to perform uncontrollable flapping movements when travelling at speed on the road, as a result of the passive steering used, the at least one steering cylinder damps the steering movements of the module axle, which occur as a consequence of caster friction.

In accordance with a further aspect of the present invention the active steering of the module axle is not operated by way of the hydraulics of the main steering circuit of the chassis of the vehicle crane, but is equipped with a separate hydraulic assembly which is only electronically actuated by way of the steering circuit of the chassis so that the cabling complication and expenditure which is otherwise usually involved, for the hydraulics of the steering cylinder, can be eliminated.

In accordance with still a further aspect of the present invention the module axle is provided both with its own suspension system and also an independent braking installation, wherein both the braking installation and also the suspension system is integrated into the suspension or braking circuit of the chassis. By virtue of the fact that the additional module axle is equipped with an independent braking installation and its own suspension system, maneuverability of the running gear of the overall vehicle crane can be further improved. By the module axle being equipped with an independent braking and suspension system, it is possible in particular to achieve dynamic axle load compensation, whereby the entire vehicle remains controllable, in particular in the event of very powerful steering and/or braking processes, insofar as the additional module axle is incorporated into the braking and/or suspension or damping process. That active integration of the module axle into the suspension or braking system of the chassis of the vehicle crane is important and advantageous in particular for the reason that, as has been explained hereinbefore, the module axle is used precisely when the vehicle crane is of an increased total weight, whereby unwanted vehicle behaviour such as for example rocking or pitching is encouraged, which however is to be minimised precisely for safety reasons.

It is admittedly possible for integration of the braking installation and the suspension system of the module axle into the braking or suspension circuit of the chassis to be effected in such a way that the braking installation or the individual suspension elements of the module axle are operated by way of the hydraulic system of the chassis of the vehicle crane. As however, as has already been explained hereinbefore, a separate hydraulic assembly is optionally provided on the module axle, it can also be used in accordance with the invention for actuation of the braking installation or the suspension system of the module axle so that it is possible to eliminate separate piping in respect of the braking installation or the suspension system of the module axle by way of the hydraulic circuit of the chassis of the vehicle crane and only the separate hydraulic assembly provided on the module axle has to be electronically controlled by way of the suspension or braking circuit of the chassis. On the one hand in turn that has a positive effect on total weight and also on the susceptibility of the braking installation or the suspension system of the module axle.

In order to match the steering sensitivity of the module axle to the respective total laden weight the steering damping effect produced by way of the at least one steering cylinder is adjustable by way of a throttle. That can guarantee that the module axle can be adjusted in dependence on the respective useful load and a desired level of steering sensitivity so that the vehicle can always be optimally maneuvered.

As has already been explained hereinbefore it is normally necessary for the running gear of the chassis of a mobile crane to be equipped with at least two steering circuits in order in the event of failure of the main steering circuit to ensure that the steered axles still remain controllable by way of the emergency steering circuit and in particular can still be steered actively by way of the emergency steering circuit, in particular in the event of failure of the main steering circuit. As however the provision of an emergency steering circuit is very complicated and cost-intensive and in addition can adversely influence the total weight of the mobile crane, in accordance with a further aspect of the present invention there is provided a vehicle crane in which it is possible to eliminate an emergency steering circuit without the controllability of the vehicle crane in the event of a failure of the main steering circuit being lost. That vehicle crane according to the invention has a chassis with at least two axles which are actively steered by way of a single steering circuit and of which at least one of the steered axles has a preset caster $\alpha$. In the event of a failure of the active steering of one of the steered axles of the chassis the steering of that axle can be separated from the steering circuit of the chassis so that, after uncoupling from the steering circuit of the chassis, that axle continues to steer passively purely utilising the caster property of the caster angle $\alpha$ set in that way. That makes it possible to prevent one of the steered axles of the chassis remaining set rigidly at the steering lock last achieved, in the event of a failure of the main steering circuit, so that the steering behaviour of the vehicle crane is adversely influenced or made entirely uncontrollable.

As in the case of a failure of the active steering of one of the steered axles the vehicle crane or the chassis thereof tends to perform uncontrollable flapping movements in on-road travel at relatively high speed as a consequence of the passive steering which occurs, the steering movements which occur as a consequence of the caster friction, in respect of the axle which is now passively steered, are damped by way of at least one of the steering cylinders which are required for active steering in the case of fault-free operation of the main steering circuit.

So that, as a consequence of passive steering occurring in respect of one of the steered axles of the chassis, the steering sensitivity thereof can be matched to the total laden weight of the vehicle crane, the degree of damping which can be achieved by way of the steering cylinder or cylinders of the steered axles can be adjusted by way of a throttle. In that way it is again possible to ensure that each of the steered axles can be adjusted in the case of the onset of passive steering in dependence on the respective useful load and a desired level of steering sensitivity so that the vehicle crane always remains optimally maneuverable.

In accordance with still a further aspect of the present invention there is provided a module axle which is suitable for releasable mounting to the rear of a chassis of a vehicle crane and which is equipped with active steering with which it can be operated by way of a main steering circuit of the chassis of a vehicle crane. So that the steerable module axle still remains controllable in the case of a failure of its active steering, it has a preset caster or trail $\alpha$, with the utilisation of which it still remains passively steerable in the event of a failure on the part of the active steering.

So that the module axle can be actively steered it is equipped with at least one steering cylinder which can be actuated and operated for example electro-hydraulically by way of a steering circuit of the chassis of the vehicle crane. As, in the event of failure of that active steering, the steerable module axle can have a tendency to uncontrollable flapping and rocking movements in fast on-road travel as a result of the passive steering which then takes place, that at least one steering cylinder damps the steering movements of the module axle, which occur as a result of caster friction.

In accordance with a further aspect of the present invention the module axle according to the invention is equipped with a separate hydraulic assembly so that the active steering of the module axle does not have to be operated by way of the hydraulics of a steering circuit of a chassis of a vehicle crane, but can be effected by way of that separate hydraulic assembly which for example can be only electronically actuated by way of the steering circuit of the chassis of a vehicle crane so that the expensive piping expenditure which is otherwise usually required for the hydraulics of the steering cylinder of the module axle can be eliminated.

In accordance with still a further aspect of the present invention the module axle is provided both with its own suspension system and also with an independent braking installation, wherein both the braking installation and also the suspension system can be integrated into the suspension or braking circuit of a vehicle crane. Because the module axle is provided with an independent braking installation and/or its own suspension system the maneuverability of a vehicle crane in the event of fitment of the module axle according to the invention can be improved. Insofar as the module axle is provided with an independent braking and suspension system therefore dynamic axle load compensation can be achieved in the event of it being mounted to a vehicle crane, whereby, particularly in the case of powerful steering and/or braking operations the vehicle crane remains better controllable insofar as the mounted module axle is incorporated into the braking and/or suspension or damping process.

In an exemplary embodiment of the invention the caster may be about 3.degree.-15.degree.. Tests have shown that in particular a caster between about 6.degree.-10.degree. can be advantageous. In particular, a caster of about 90 may be advantageous. Road trials have shown that no problems appeared both at high velocities and low velocities if the module axle according to the present invention had a caster of in particular about 9.degree.

As the module axle according to the invention is to be suitable for mounting to vehicle cranes of differing types, the steering damping effect which can be achieved by way of the at least one steering cylinder of the module axle is adapted to be adjustable by way of a throttle so that the level of steering sensitivity of the module axle can be adapted to the total weight of the respective type of vehicle crane. That can ensure that the steering sensitivity of the module axle can be adjusted to the respective type of vehicle crane and a useful load which is possibly present so that the respective vehicle crane always remains optimally maneuverable even in the event of mounting the module axle according to the invention.

BRIEF DESCRIPTION OF THE DRAWINGS

A number of exemplary embodiments of the present invention will be described in greater detail hereinafter for better understanding and further description of the invention, with reference to the accompanying drawings.

FIG. 1b shows a plan view of the vehicle crane according to the invention as shown in FIG. 1a.

FIG. 2b shows a front view of the module axle of FIG. 2a.

FIG. 4b shows a vertical longitudinal section through the module axle according to the invention as shown in FIG. 4a.

In all the Figures the same components are denoted by the same reference signs.

DESCRIPTION OF THE EMBODIMENTS

Figure 1A:
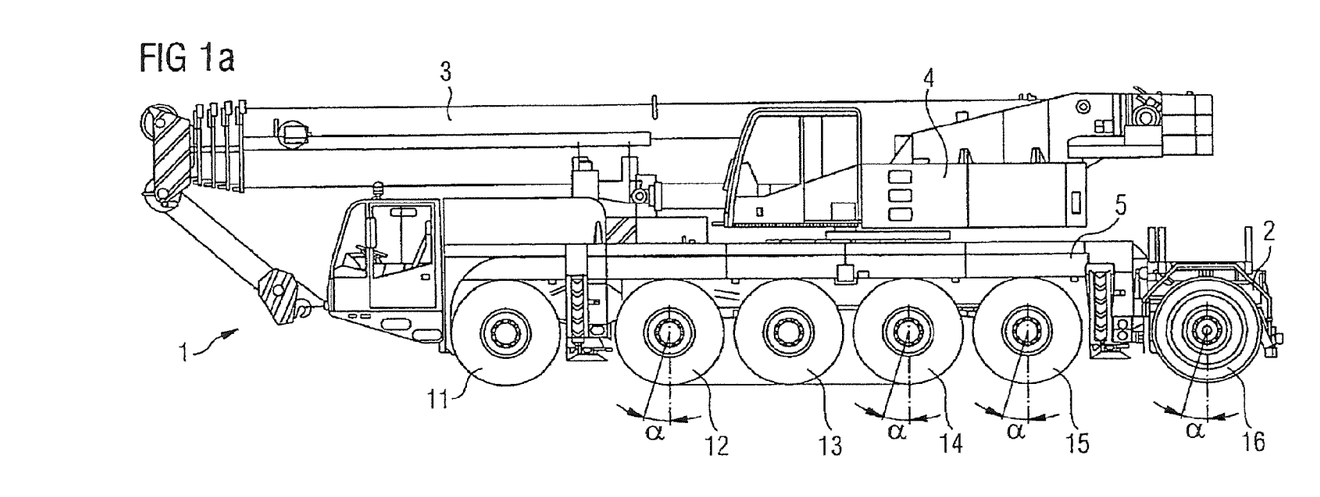
FIG. 1a is a side view showing a vehicle crane according to the invention with a module axle according to the invention mounted thereto.
Figure 1B:
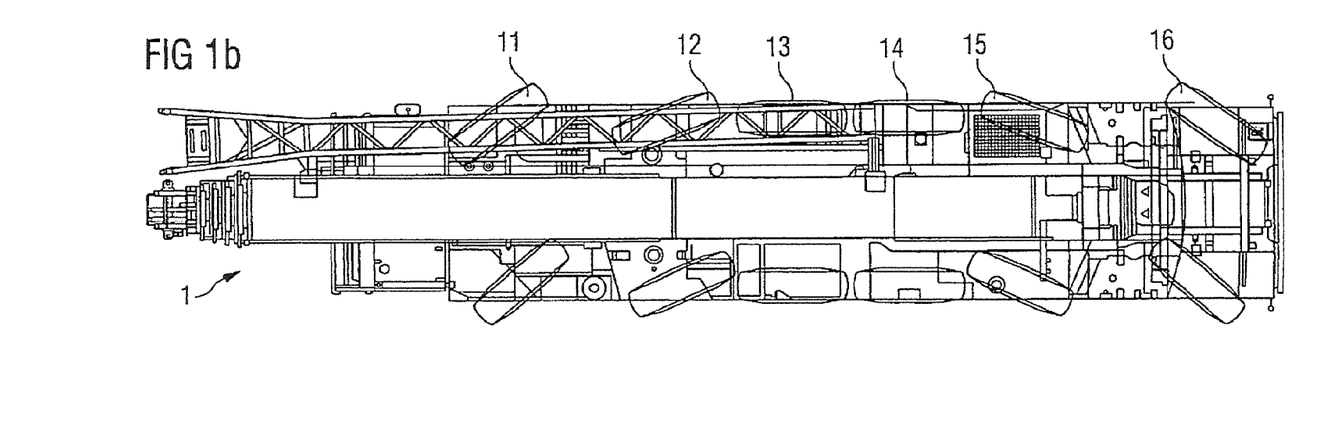

The vehicle crane according to the invention as shown in FIGS. 1a and 1b as a side view and a plan view respectively includes a chassis 5 whose running gear has five axles 11, 12, 13, 14, 15, where only the first, second, fourth and fifth axles 11, 12, 14 and 15 are steerable whereas the axle 13 is in the form of a rigid axle. Arranged on the chassis 5 of the vehicle crane 1 is a rotatable superstructure 4 which in turn has a telescopic jib 3 which here is in the telescopically retracted condition. A module axle 2 according to the invention is also releasably fixed to the rear of the chassis 4, the axle 16 of the module axle 2 here also being of a steerable nature. By virtue of the module axle 2 being mounted to the rear of the chassis 5, the unit which is formed from the chassis 5 and the module axle 2 jointly can also be viewed as a chassis of the vehicle crane 1—especially as here the axle 16 of the module axle 2 is also adapted to be steerable.

As is here diagrammatically indicated in each case by the angle α, the steerable axles 12, 14 and 15 and the axle 16 of the adaptable module axle 2 are provided with a caster, which means that the associated steering swivel pins are arranged at a certain angle, namely α, in the longitudinal direction of the running gear. Admittedly, in this case all casters are identified by the same angle α, but this does not mean that all the casters must be of equal size. Rather, the caster angles of the individual axes can be of differing magnitudes, depending on the respectively required level of steering sensitivity. So that the running gear remains actively steerable in the event of a failure of the main steering circuit, at least one axle is controllable by way of an emergency steering circuit and does not have a caster α, like the axle 11 in this case. It will be appreciated however that equally for example one of the other axles could be designed without caster, but in return it would remain actuable by way of an emergency steering circuit in a fault situation.

As will be described in the further course of the specific description and in particular in regard to the description of FIGS. 5a to 5c, it is found to be desirable for at least one of the steerable axles to be provided with a caster α, as in that way it is no longer necessary to provide an emergency steering circuit for the steerable axles, to cover the event that the main steering circuit should fail. More specifically, because the steerable axles 12, 15, 16 are constructed with a caster α, the axle affected by the failure still continues to steer, as a result of the passive steering which occurs due to caster friction.

Figure 2A:
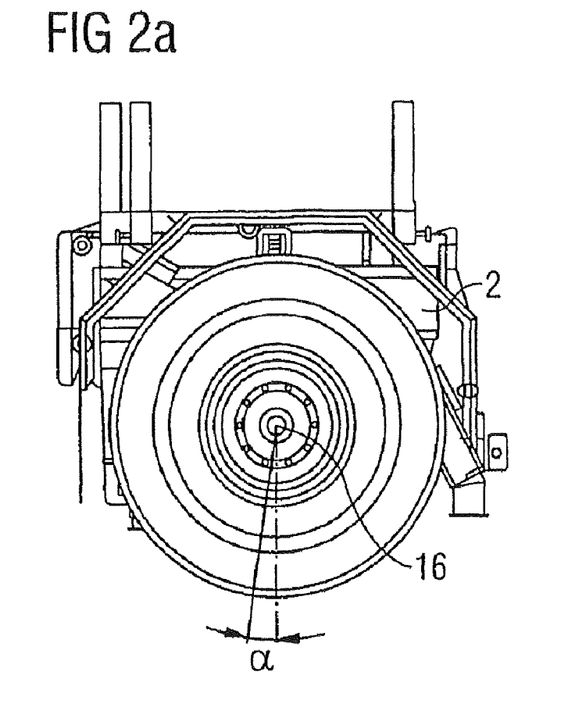
FIG. 2a shows a side view of a module axle according to the invention.

FIG. 2a shows the module axle 2 according to the invention in a condition of being dismounted from the chassis 5 of the vehicle crane 1. As is diagrammatically shown here once again, the module axle 2 also has a caster angle α so that the module axle 2 remains passively steerable in the event of failure of its active steering (not shown here), as a consequence of the caster friction which then occurs.

Figure 2B:
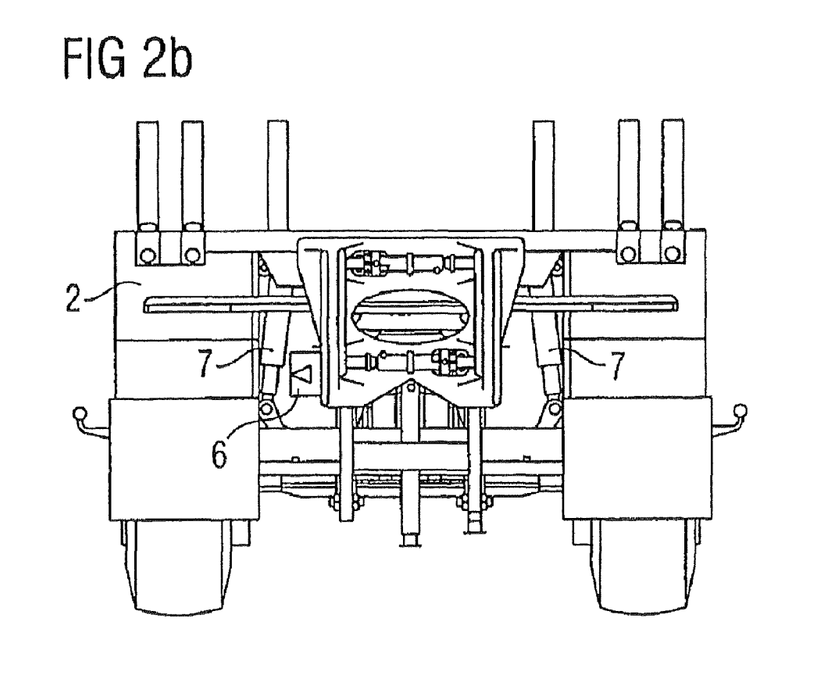

FIG. 2b shows a front view of the adaptable module axle 2 of FIG. 2a, here diagrammatically showing a hydraulic assembly 6 with which the steering of the module axle 2 can be separately operated. The separate hydraulic assembly 6 can be coupled to a main steering circuit of a chassis of a vehicle crane and controlled thereby. It will be appreciated that it is also possible for the suspension cylinders 7 and the brake cylinders (not shown here) of the module axle 2 to be supplied with compressed air and controlled, with the separate hydraulic assembly 6. If however that should not be wanted, then the suspension cylinders 7, the brake cylinders (not shown here) and the steering of the module axle 2 can also be supplied with compressed air or with hydraulic pressure and controlled by way of the corresponding systems of a chassis of a vehicle crane.

Figure 2C:
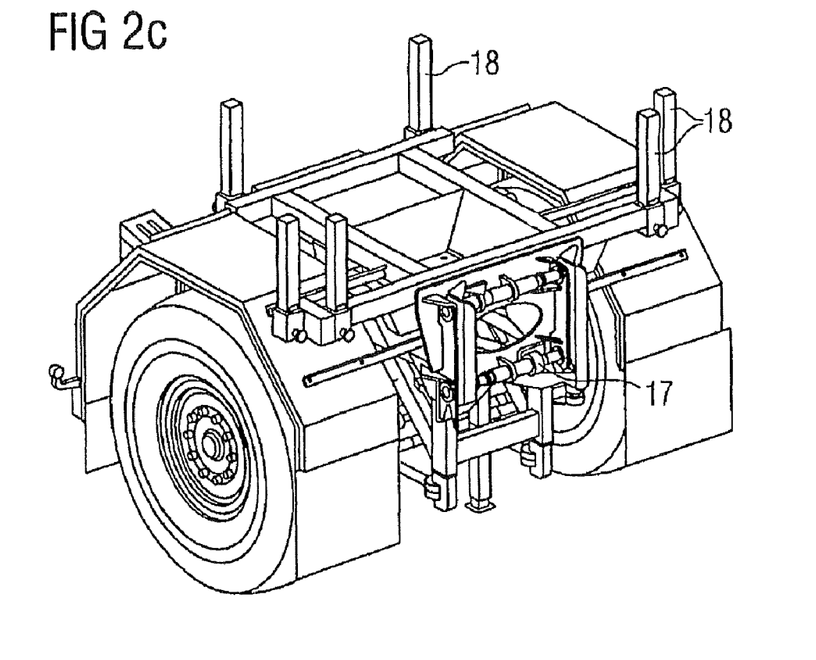
FIGS. 2c and 2d show a perspective front and rear view respectively of the module axle according to the invention as shown in FIGS. 2a and 2b.
Figure 2D:
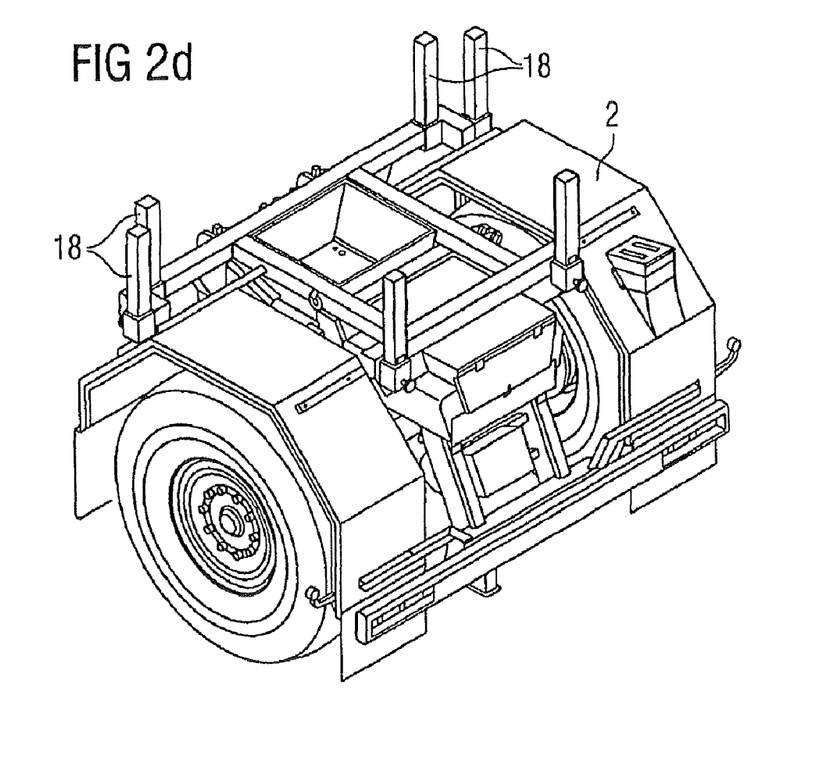

As can be seen from the perspective views of the module axle 2 in FIGS. 2*c* and 2*d*, disposed at the top side of the module axle is a storage surface which is in the form of a grid and which is suitable for receiving and storing additional weights which can be transported with the module axle 2. As the module axle 2 is suitable by way of the coupling 17 for releasable fixing to different types of vehicle crane and must therefore also be capable of transporting counterweights of different sizes, the grid structure is provided with a plurality of displaceable centering posts 18 which, by virtue of their displaceability, are suitable for being adapted to the respective shape and position of the respective counterweights.

Figure 3:
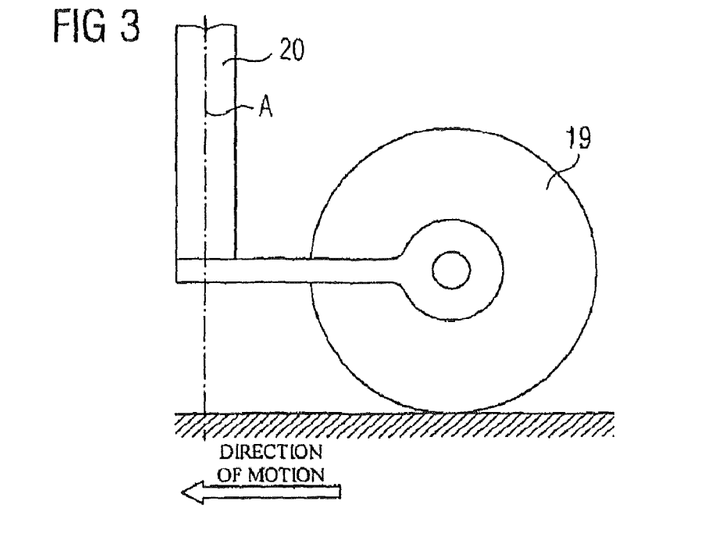
FIG. 3 illustrates the functional principle of caster friction steering.

To explain the operating principle of the caster friction steering, reference is now made to FIG. 3 which is a simplified view showing a wheel suspension arrangement provided with a caster. The wheel 19 is here suspended by way of a fork 20 on a chassis arrangement 21, the fork 20 being rotatable about the axis of rotation A. When now the chassis arrangement 20 is moved in the direction of travel, then the wheel 19, by way of the fork 20, will always be set in the direction which is predetermined by the chassis arrangement 20 and will thus contribute passively to steering of the chassis arrangement 20. The result of this is that the chassis arrangement 20 is better maneuverable, in contrast to a rigid wheel mounting structure.

Figure 4A:
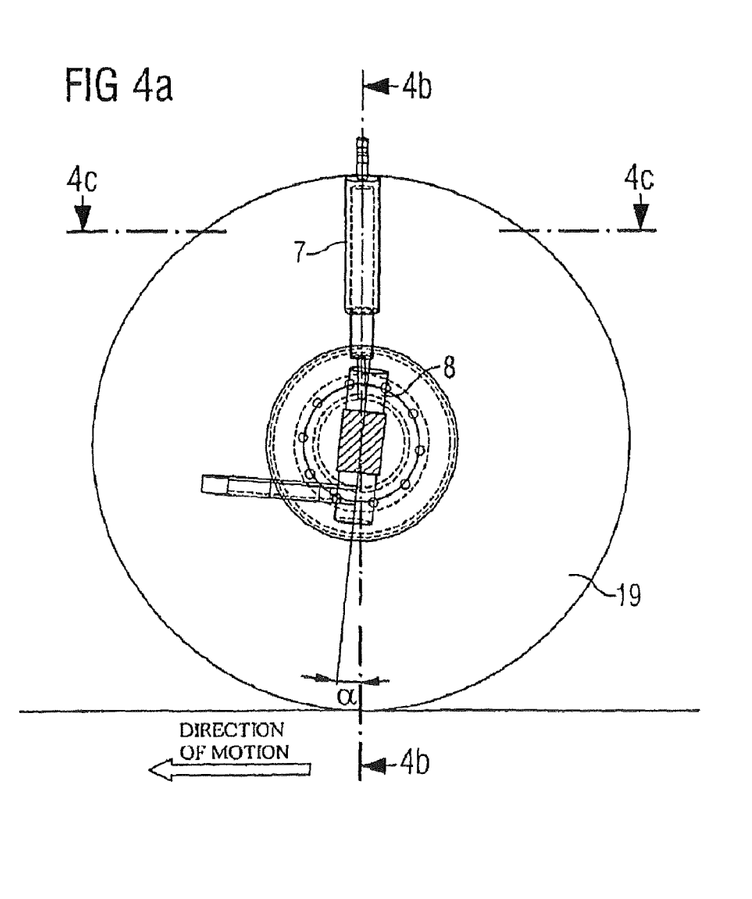
FIG. 4a shows a view in cross-section through the module axle according to the invention.
Figure 4B:
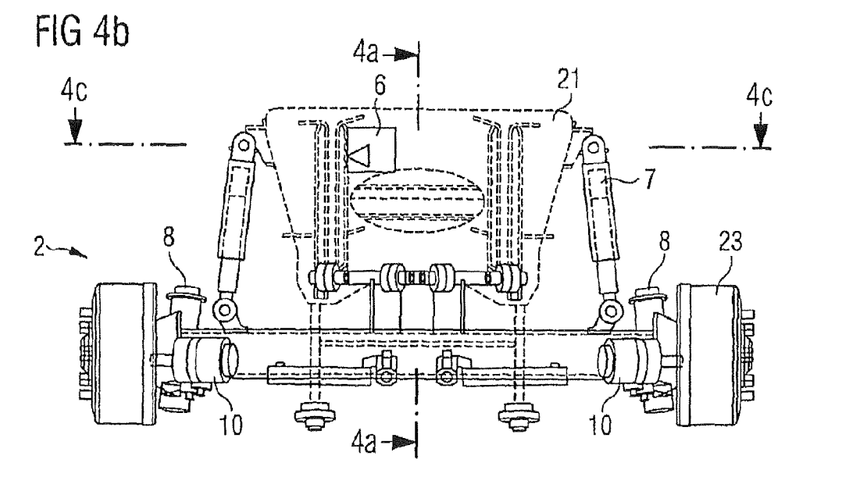
Figure 4C:
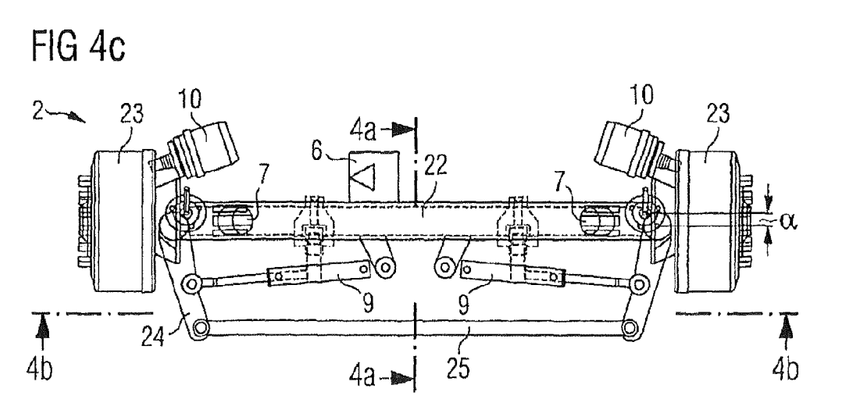
FIG. 4c shows a horizontal longitudinal section through the module axle according to the invention as shown in FIG. 4b.

The module axle according to the invention will now be described in greater detail with reference to FIGS. 4*a* to 4*c*. As can best be seen from consideration of those Figures jointly, the axle body 22 which carries the brake drums 23, the steering arms 24, the steering cylinders 9, the steering swivel pins 8 and the brake cylinders 10 is arranged resiliently by way of the suspension cylinders 7 on the chassis structure 21 of the module axle 2 according to the invention. As can be seen from FIG. 4*a* the swivel pins 8 are inclined at a caster angle a so that the wheel 19 can be steered passively, utilising the caster property of the module axle. In order to be able to actively steer the module axle 2 in the case of its being mounted to a chassis of a vehicle crane, the module axle 2 has a hydraulic assembly 6 (only diagrammatically shown here) which can be steered by way of the main steering circuit of the vehicle crane. For that purpose the hydraulic assembly 6 is connected to the electrical branch of the usually electro-hydraulic steering of the vehicle crane in order in that way to receive the electrical control signals of the main steering circuit of the vehicle crane and to be controlled.

By virtue of the hydraulic assembly 6 being coupled to the main steering circuit of a vehicle crane it can thus actuate the two steering cylinders 9 which, by way of the steering arms 24 and the track rod 25, implement steering deflection of the wheels 19 about the inclined axis of the steering swivel pins 8. Thus active steering of the module axle 2 can be effected by way of the main steering circuit of the vehicle crane, by electrical actuation of the hydraulic assembly 6. Instead of providing for steering of the module axle 2 by way of electrical actuation of the hydraulic assembly 6, it will be appreciated that it is also possible for the steering cylinders 9 to be coupled directly to the hydraulic circuit of the main steering circuit of a vehicle crane so that the hydraulic assembly 6 could be omitted. If now for example failure of the hydraulic assembly 6 or damage to the hydraulic pipes or hoses or to the electrical actuation of the hydraulic assembly 6 should occur, the result of this is that the axle 16 of the module axle 2 does not remain set rigidly for example at the steering lock angle which was last applied, but continues to steer passively, utilising the passive steering effect, as a consequence of the caster friction caused by the caster angle $\alpha$, and thus remains controllable. As will be described in fuller detail hereinafter it will be appreciated that it is also possible for the brake cylinders 10 and the spring cylinders 7 also to be operated with compressed air or with hydraulic pressure by way of the hydraulic assembly 6.

Figure 5A:
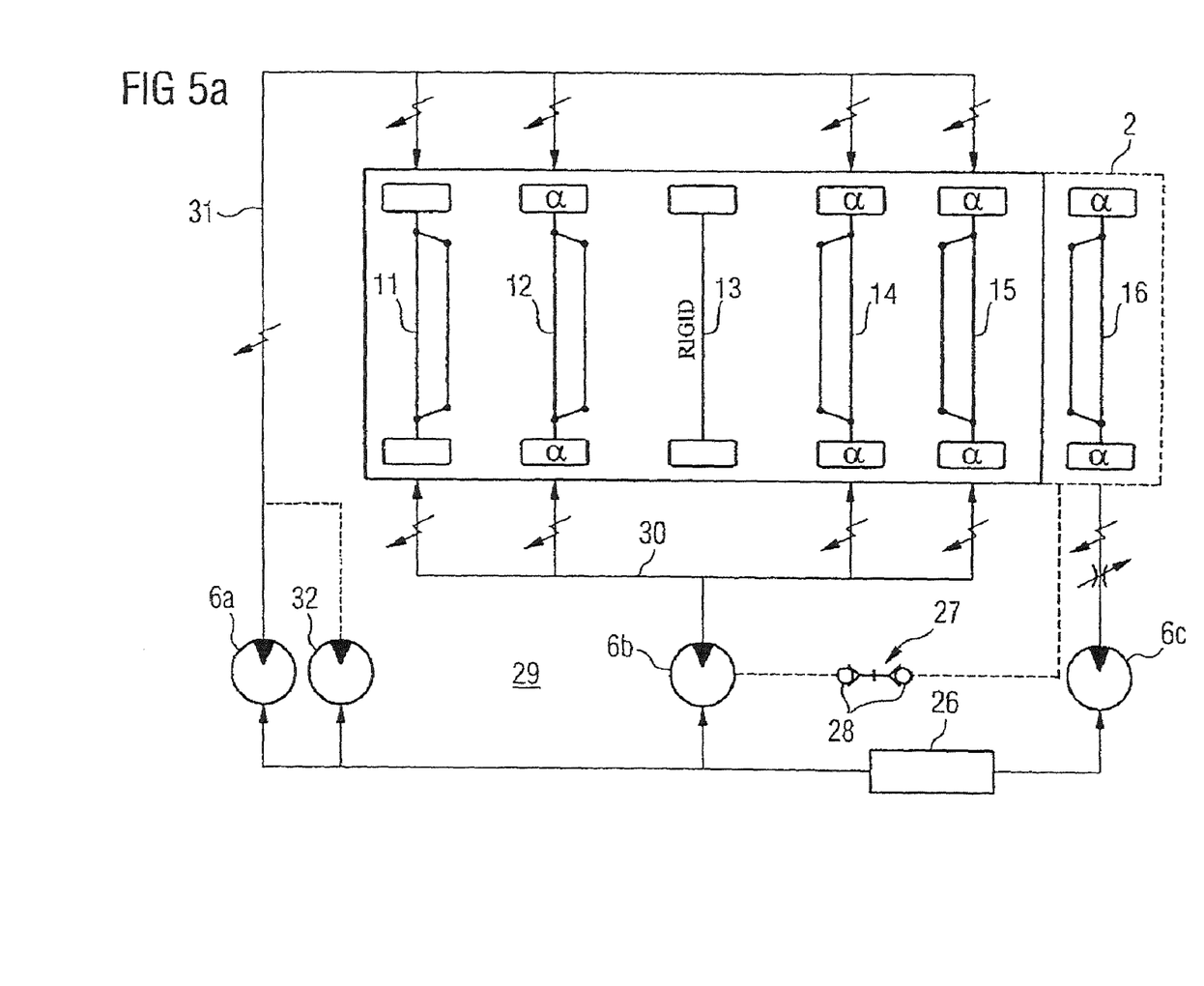
FIG. 5a shows a simplified hydraulic circuit diagram of the hydraulic steering of the vehicle crane according to the invention and the module axle.
Figure 5B:
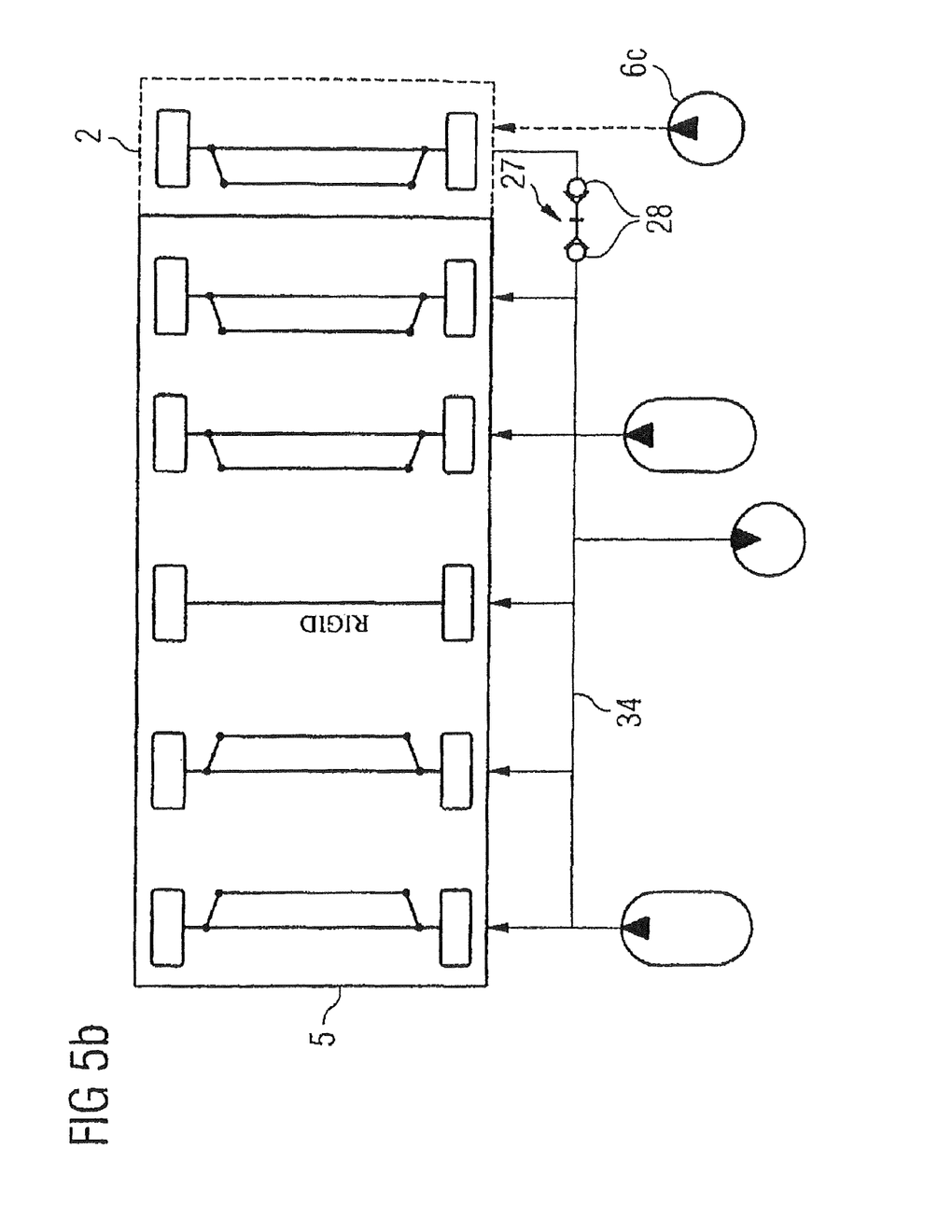
FIG. 5b shows a simplified hydraulic circuit diagram of the hydraulic suspension of the vehicle crane according to the invention and the module axle.
Figure 5C:
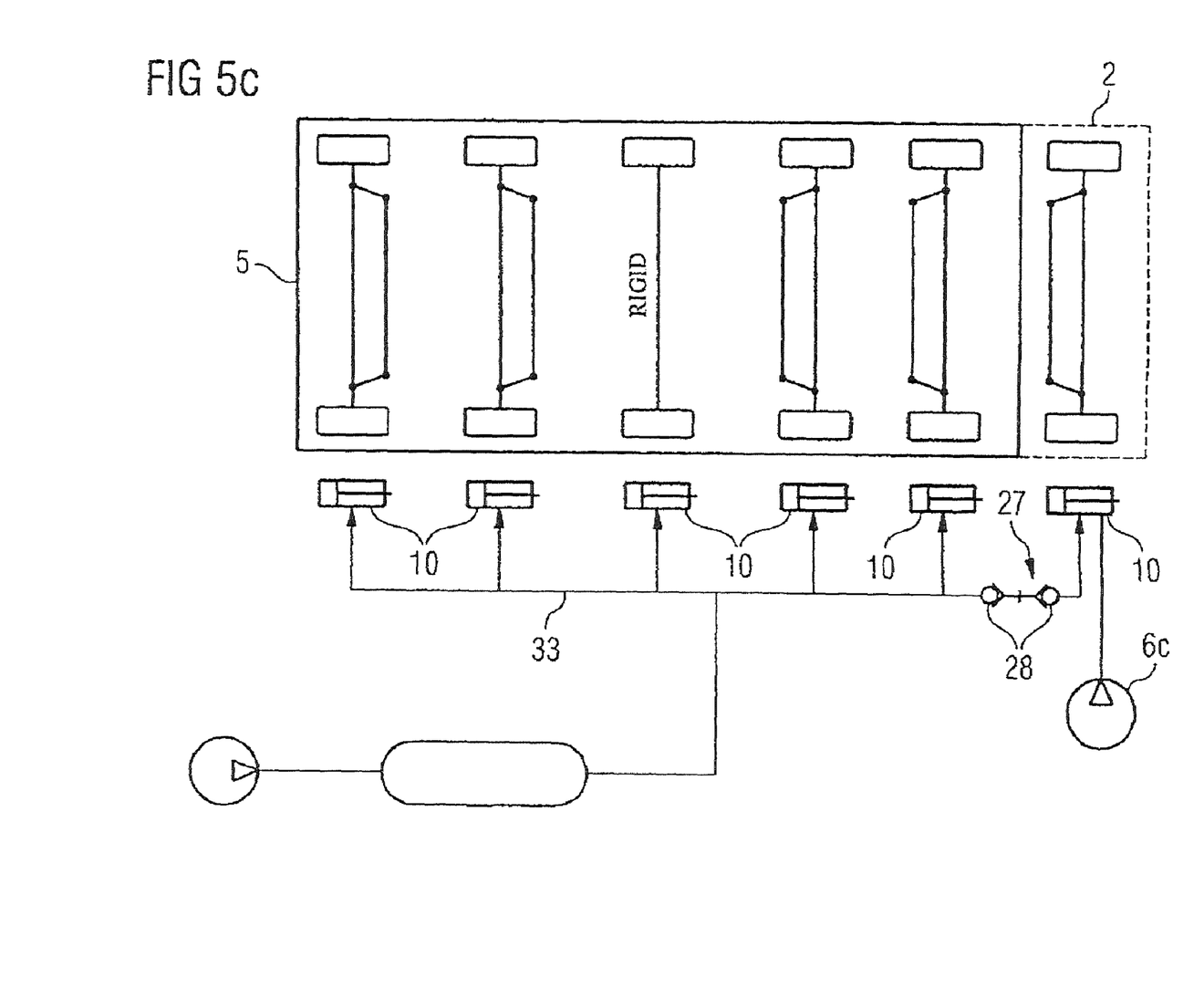
FIG. 5c shows a simplified hydraulic circuit diagram of the braking installation of the vehicle crane according to the invention with the module axle mounted thereto.

Reference will now be made to FIGS. 5*a* to 5*c* to describe the operating principle of the invention. FIG. 5*a* shows a hydraulic circuit diagram relating to actuation of the axles 11, 12; 14, 15, which are steerable here, of a chassis 5 (only diagrammatically illustrated here) of a vehicle crane, to which a module axle 16 which is also steerable is releasably mounted at the rear end thereof. As can be seen from the illustration, the axles 11, 12 are actuated by way of a first hydraulic assembly 6*a*, the axles 14, 15 by way of a second hydraulic assembly 6*b* and the module axle 16 by way of a third separate hydraulic assembly 6*c*. In this case the hydraulic assembly 6*b* actuates the left-hand steering cylinders of the axles 11, 12, 14 and 15 by way of the first steering circuit 30 and the hydraulic assembly 6*b* actuates the right-hand steering cylinders of the axles 11, 12, 14 and 15 by way of the second steering circuit 31. In this case, the first steering circuit 30 as well as the second steering circuit 31 belong to the main steering circuit 29 of the vehicle crane and likewise the steering control 26 which actuates the hydraulic assemblies 6*a* and 6*b* by means of electrical signals. So that the first axle 11 remains controllable in the event of a failure of the main steering circuit an emergency steering pump 32 in the fault situation delivers hydraulic oil into the main steering circuit 29. In addition the separate hydraulic assembly 6*c* arranged on the module axle 16 is also connected to the steering control 26 and can thus be controlled by way of the main steering circuit 29 of the vehicle crane 1. It will be appreciated however that it is also possible not to provide a separate hydraulic assembly for the module axle 2, but for the active steering of the module axle 16 to be operated by way of the second hydraulic assembly 6*b*, as is indicated by the broken line. For that purpose the hydraulic circuit of the module axle 2 could be coupled to the main steering circuit 29 of the chassis for example by way of a quick-action coupling 27 with two non-return valves 28. In fault-free operation of the electro-hydraulic steering illustrated here of the vehicle crane with the module axle 2 mounted thereto therefore, all steerable axles 11, 12, 14, 15, 16 are steered actively by way of the hydraulic assemblies 6*a*, 6*b* or also 6*c* which in turn are controlled by way of the steering control 26.

If now one of the hydraulic branches should fail or be damaged, or if there should be a disturbance in the electrical actuation of the hydraulic assemblies 6*a*, 6*b*, 6*c*, as is indicated here by the flash symbols, the result of this is that admittedly the respectively affected active steering by way of the corresponding hydraulic assembly fails, but the affected axle 12, 14, 15 and 16 is still further steered passively by utilising the caster property of the respective axle.

As can finally also be seen from FIGS. 5*b* and 5*c*, the module axle according to the invention is coupled to the braking installation 33 (see FIG. 5*c*) and to the suspension circuit 34 (see FIG. 5*b*) of the chassis of the vehicle crane by way of a quick-action coupling 27 with two non-return valves 28 and can thus be involved in dynamic axle load compensation of the overall system comprising the chassis 5 and the module axle 2. Accordingly the travel characteristics of the vehicle crane can be positively influenced by mounting the module axle 2 to the chassis 5. Admittedly here the module axle 2 is shown as being connected to the braking installation 33 and to the suspension system 34 respectively of the vehicle crane but, as has already been explained hereinbefore, it is equally possible for the compressed air supply for the suspension arrangement or the braking installation of the module axle to be afforded by way of a separate hydraulic assembly 6c arranged on the module axle 2, as is indicated here by the broken lines.

LIST OF REFERENCES 1 vehicle crane
2 module axle
3 telescopic jib
4 superstructure
5 chassis
6 hydraulic assembly
7 suspension cylinder
8 steering swivel pin
9 steering cylinder
10 brake cylinder
11 first axle
12 second axle
13 third axle
14 fourth axle
15 fifth axle
16 sixth axle
17 coupling
18 centering post
19 wheel
20 fork
21 chassis arrangement
22 axle body
23 brake drum
24 steering arm
25 track rod
26 steering control
27 quick-action coupling
28 non-return valve
29 main steering circuit
30 first steering circuit
31 second steering circuit
32 emergency steering pump
33 braking circuit
34 suspension circuit
A axis of rotation

What is claimed is:

1. A vehicle crane comprising:
a first chassis having a first end and a second end, said first chassis having a first suspension system, at least one actively steerable axle and a first steering system operably coupled to said at least one actively steerable axle;
a second chassis releasably coupled to said second end;
a module axle coupled to said second chassis by a fork, said fork being rotatable about an axis of rotation wherein the axis of rotation is offset from the module axle, said module axle includes a second steering system operably coupled to a wheel, said wheel having a preset caster angle, wherein said second steering system is operably coupled to said first steering system to actively steer said module axle during a first mode of operation and passively steer said module axle during a second mode of operation.

2. The vehicle crane of claim 1 wherein:
said first steering system includes a first hydraulic system coupled to said first chassis and operably coupled to said first steering system; and,
said second steering system includes a second hydraulic system removably coupled to said first hydraulic system.

3. The vehicle crane of claim 2 further comprising a steering control operably coupled to said first hydraulic system and said second hydraulic system to actively steer said at least one actively steerable axle and said module axle during said first mode of operation.

4. The vehicle crane of claim 1 wherein said module axle further includes
a swivel pin operably coupled to said second chassis, said swivel pin having a preset caster angle; and,
wherein said wheel is rotatably coupled to said swivel pin, wherein said wheel is passively steerable during said second mode of operation.

5. The vehicle crane of claim 4 wherein said second steering system further includes at least one steering cylinder operably coupled between said wheel and said first steering system.

6. A vehicle crane comprising:
a first chassis having a first end and a second end, said first chassis having a first suspension system, at least one actively steerable axle and a first steering system operably coupled to said at least one actively steerable axle;
a module axle releasably coupled to said second end, said module axle includes a second steering system operably coupled to a wheel, said wheel having a preset caster angle, wherein said second steering system is operably coupled to said first steering system to actively steer said module axle during a first mode of operation and passively steer said module axle during a second mode of operation, wherein said module axle further includes a second suspension system operably coupled to said first suspension system.

7. A vehicle crane comprising:
a chassis having a first end and a second end, said chassis include a first suspension system, at least one steerable axle and a steering system operably coupled to said at least one steerable axle; and,
a module axle releasably mounted to said second end, said module axle including a wheel having a preset caster angle and a second suspension system, wherein said second suspension system is operably coupled to said first suspension system, and wherein said module axle is operably coupled to said steering system to actively steer said wheel.

8. The vehicle crane of claim 7 wherein said module axle is passively steered by said preset caster angle when said steering system does not actively steer said wheel.

9. The vehicle crane of claim 8 wherein said module axle further comprises at least one steering cylinder operably coupled to said steering system.

10. The vehicle crane of claim 9 wherein said a steering cylinder is operably arranged to damp movement of said wheel when said steering system does not actively steer said wheel.

11. The vehicle crane of claim 10 wherein a steering sensitivity of said module axle is adjusted by a throttle operably coupled to said steering cylinder.

12. The vehicle crane of claim 10 wherein said module axle includes a hydraulic system operably coupled to said steering system and said steering cylinder.

13. The vehicle crane of claim 8 wherein:
said chassis includes a braking system operably coupled to said at least one steerable axle; and,
said module axle further includes a brake cylinder operably coupled to said braking system.

14. A vehicle crane having a chassis having a first steering system, a first suspension system, at least one steerable axle coupled to said first steering system, and a first braking system operably coupled to said at least one steerable axle, said vehicle crane comprising:
- a modular member operably coupled to one end of said chassis;
- a second steering system coupled to said modular member and operably coupled to said first steering system said second steering system having a fork rotatable about an axis of rotation;
- a wheel operably coupled to said second steering system by said fork, said fork, axis of rotation being offset from an axis of rotation of said wheel, said wheel having a preset caster angle, wherein said wheel is passively steerable by said preset caster angle due to caster friction when said first steering system fails to operate; and
- a second suspension system operably coupled to said first suspension system.

15. The vehicle crane of claim 14 wherein said second steering system includes at least one steering cylinder operably coupled to said wheel.

16. The vehicle crane of claim 15 wherein said at least one steering cylinder damps steering movements of said modular member when said first steering system fails to operate.

17. The vehicle crane of claim 16 wherein said second steering system includes a throttle operably coupled to said at least one steering cylinder.

18. The vehicle crane of claim 17 wherein said throttle is configurable to adjust a steering sensitivity of said second steering system.

19. The vehicle crane of claim 15 further comprising a hydraulic system coupled to said modular member and operably coupled between said first steering system and said at least one steering cylinder.

20. A vehicle crane having a chassis having a first steering system, a first suspension system, at least one steerable axle coupled to said first steering system, and a first braking system operably coupled to said at least one steerable axle, said vehicle crane comprising:
- a modular member operably coupled to one end of said chassis;
- a second steering system coupled to said modular member and operably coupled to said first steering system;
- a wheel operably coupled to said second steering system, said wheel having a preset caster angle, wherein said wheel is passively steerable by said preset caster angle when said first steering system fails to operate;
- a second suspension system operably coupled to said first suspension system and,
- a second braking system coupled to said modular member and operably coupled between said first braking system and said wheel.

* * * * *